United States Patent
McGrane et al.

(10) Patent No.: US 9,872,560 B2
(45) Date of Patent: Jan. 23, 2018

(54) FLAT FOLDED MOBILE DEVICE HOLDER

(71) Applicant: Flatstand LLC., Arlington Heights, IL (US)

(72) Inventors: Thomas James McGrane, Arlington Heights, IL (US); Anne Catherine McGrane, Arlington Heights, IL (US)

(73) Assignee: Flatstand LLC, Arlington Heights, IL (US)

( * ) Notice: Subject to any disclaimer, the term of this patent is extended or adjusted under 35 U.S.C. 154(b) by 0 days.

(21) Appl. No.: 14/991,972

(22) Filed: Jan. 10, 2016

(65) Prior Publication Data
US 2016/0338487 A1    Nov. 24, 2016

Related U.S. Application Data

(60) Provisional application No. 62/116,397, filed on Feb. 14, 2015.

(51) Int. Cl.
*A47B 23/04* (2006.01)
*F16M 13/00* (2006.01)
*B64D 11/00* (2006.01)
*F16M 11/38* (2006.01)

(52) U.S. Cl.
CPC .......... *A47B 23/04* (2013.01); *B64D 11/0015* (2013.01); *F16M 11/38* (2013.01); *F16M 13/00* (2013.01); *A47B 23/042* (2013.01)

(58) Field of Classification Search
USPC ................. 248/459, 460; 40/124.14, 124.15, 40/124.16; 206/45.2, 45.21, 45.24, 45.25, 206/45.27, 45.28, 45.29, 45.3
See application file for complete search history.

(56) References Cited

U.S. PATENT DOCUMENTS

| | | | | |
|---|---|---|---|---|
| 1,675,060 A | * | 6/1928 | Simmons | B41J 29/15 248/459 |
| 3,119,194 A | * | 1/1964 | Ray | A47B 23/044 248/459 |
| 3,367,557 A | * | 2/1968 | Farquhar | B65D 71/16 206/140 |
| 3,462,011 A | * | 8/1969 | Farquhar | B65D 71/20 206/140 |
| 3,495,704 A | * | 2/1970 | Nelder, Jr. | B65D 71/16 206/196 |
| 5,011,072 A | * | 4/1991 | Ludwig | B42F 17/12 206/455 |
| 5,180,052 A | * | 1/1993 | Smith | B65D 5/5023 206/485 |

(Continued)

*Primary Examiner* — Alfred J Wujciak
(74) *Attorney, Agent, or Firm* — Miller, Matthias & Hull LLP

(57) ABSTRACT

A support holder for a mobile device is disclosed. The holder may include a continuous sheet of flexible material and three score lines formed parallel to transverse boundaries of the continuous sheet to define first, second and third panels and base panel. A first tab and a second tab are formed by first and second tab perforations in the base panel, with the first and second tabs positioned between the third score line and the second transverse boundary. First and second slits may be formed in the continuous sheet, and the first and second tabs can be inserted into the first and second slits after the panels are folded about the score lines to form the support holder.

14 Claims, 3 Drawing Sheets

(56) References Cited

U.S. PATENT DOCUMENTS 7,861,995 B2 * 1/2011 Liou .................... F16M 11/105
　　　　　　　　　　　　　　　　　　248/454
2012/0318950 A1 * 12/2012 Wilber ................ A47B 23/043
　　　　　　　　　　　　　　　　　　248/459

* cited by examiner

FLAT FOLDED MOBILE DEVICE HOLDER

BACKGROUND OF THE INVENTION

Transportation companies, airlines in particular, have begun to remove costly and heavy entertainment systems from their vehicles in favor of streaming entertainment directly to customers' mobile devices via Wi-Fi. This creates an immediate and growing need to provide a support mechanism to hold mobile devices at an optimal viewing angle for people who do not have stands built-in to device cases.

One embodiment is a lightweight, cost effective, stand-alone mobile device holder that is delivered flat and is folded to provide an optimal viewing angle. This holder can be used on aircraft or in other applications where people are seated and have access to a viewing surface, like a tray table or tabletop. Advertising or other communication can be printed on the holder.

SUMMARY

One embodiment is made of a single sheet of material that contains multiple adjustable score lines so that sheet panels can be folded to form an optimal viewing angle. Die-cut slots and tabs provide the holder with free-standing support on a flat surface.

Advantages

Accordingly, several advantages are as follows: to provide a hands-free means of viewing entertainment for people without stands built-in to their devices, that can be produced at a low cost and delivered to many customers inexpensively, that can be printed on one or both sides in order to communicate information or place advertising, that is flat for compact delivery and storage, that is lightweight and therefore minimizes fuel burn expense on aircraft, that is easily assembled without the need for tools or specialized skill, and that can be delivered to customers through standard processes.

DRAWINGS

The holder can be made of any flexible material, dimension, or shape to support different sizes and weights of mobile devices. A first embodiment is described below and illustrated in accompanying drawings.

DETAILED DESCRIPTION

FIGS. 1-3

First Embodiment

Figure 1:
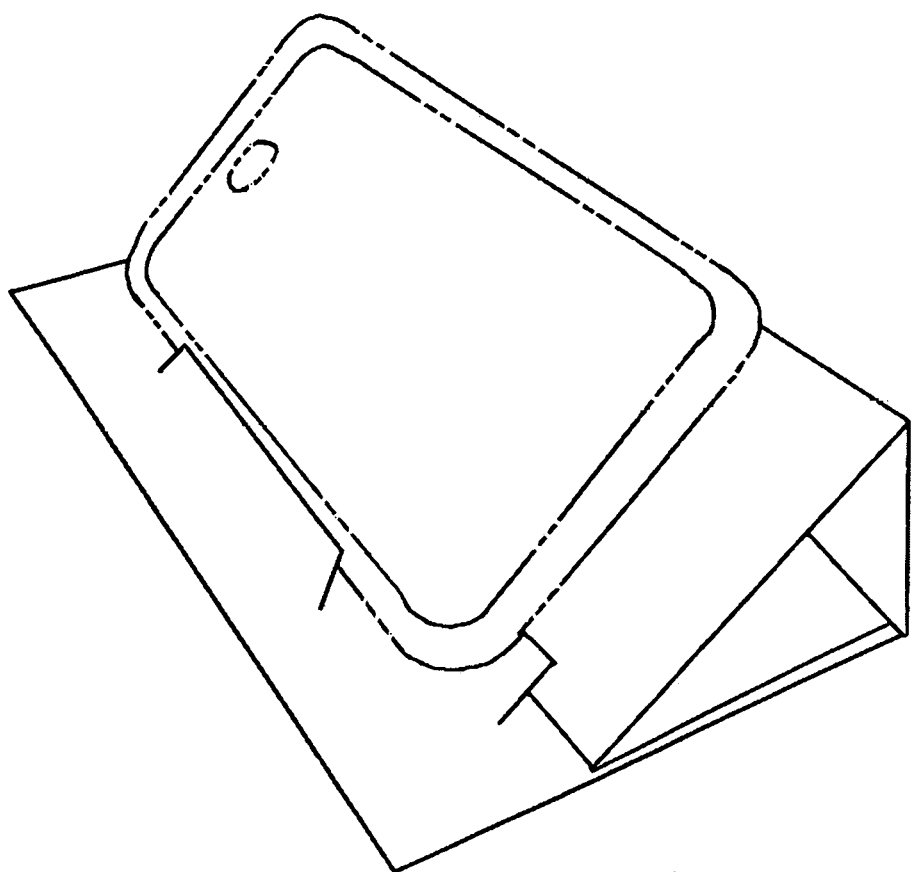
FIG. 1 shows an assembled version supporting a mobile phone.

Referring now to the drawings that illustrate a first embodiment, but not to limit the holder or its dimensions, FIG. 1 shows an assembled orientation with the holder supporting a mobile phone.

Figure 2:
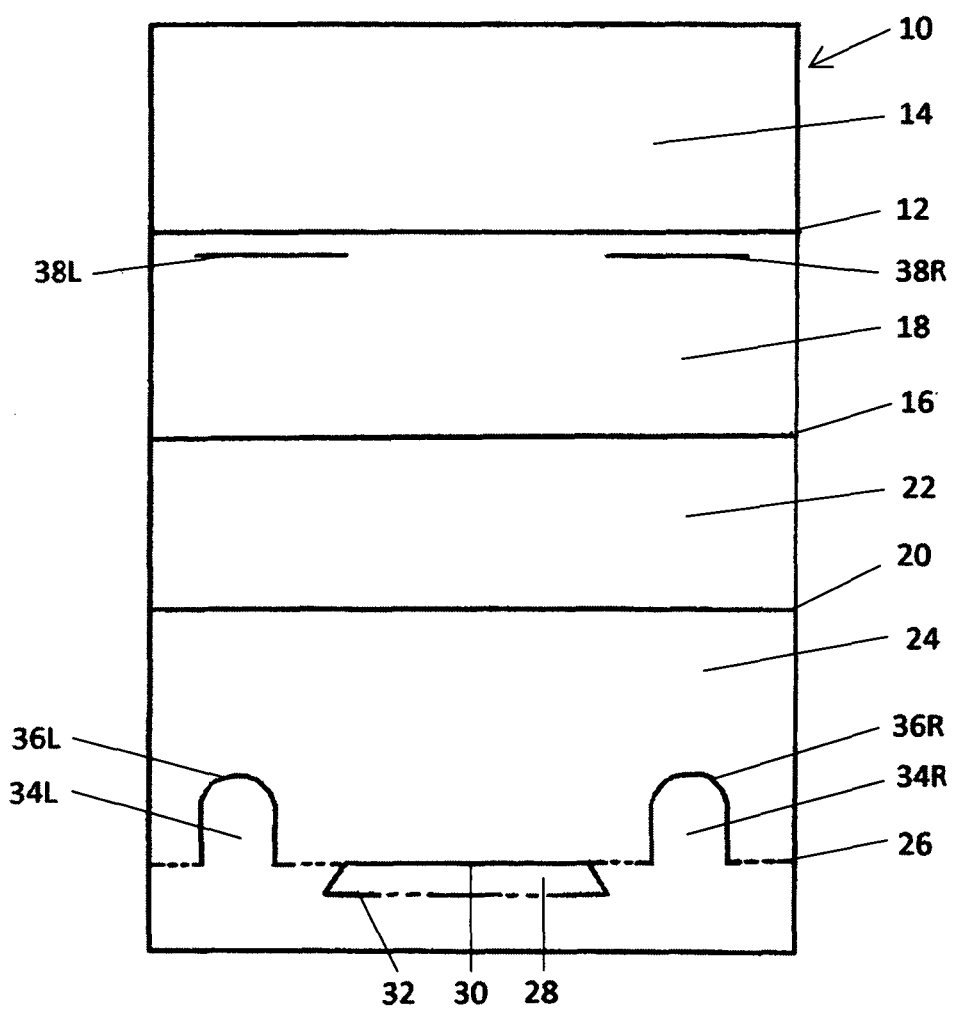
FIG. 2 shows a version of the holder as an unassembled sheet.

FIG. 2 shows a sheet view. The sheet 10 can be made of any flexible material but is best suited for heavy paper stock, light card stock or flexible plastic.

The sheet contains three parallel horizontal score lines across the sheet, edge to edge. This example, when folded, will support a mobile phone or personal electronic device at a desired viewing angle. Alternately, the holder can be manufactured to display other devices at other viewing angles by adjusting the score line position on the sheet.

A top score line 12 defines the height of top panel 14. A middle score line 16 determines the height of a backing panel 18 that directly supports the mobile device. In this version, the top panel 14 and backing panel 18 are of equal size.

Score line 20 determines panel 22 height. Panel 22 height determines the mobile device viewing angle.

A base panel 24 is below score line 20. Panel 24 sits atop the viewing surface.

Tab line 26 determines the top of a support flap 28 and the bottom of support tabs 34L and 34R. Tab line 26 is positioned slightly below where top score line 12 touches bottom score line 20 when assembled.

Support flap 28 is defined by means of flap cut 30. Support flap 28 holds the mobile device firmly to backing panel 18.

A flap cut 30 is sized to support the intended mobile device but is not more than half the width of sheet 10. Flap cut 30 is centered horizontally on sheet 10 such that the top of support flap cut 30 touches tab line 26. Flap cut 30 has two side cuts that angle down, and away from, each end and touch support base line 32.

Support flap base line 32 is wider than the top of the flap cut 30 and spaced below tab line 26 at a distance twice the thickness of the mobile device it is intended to support. Support flap base line 32 can also be scored for ease of deployment.

Two tabs 34L and 34R touch tab line 26 at their base.

Tab cuts 36L and 36R are each placed equidistant between the end of top cut 30 and the edge of sheet 10.

Backing panel 18 has two tab insert cuts 38L and 38R made below score line 12 at a distance less than half the height, and wider than the width, of the tabs 34L and 34R.

Figure 3:
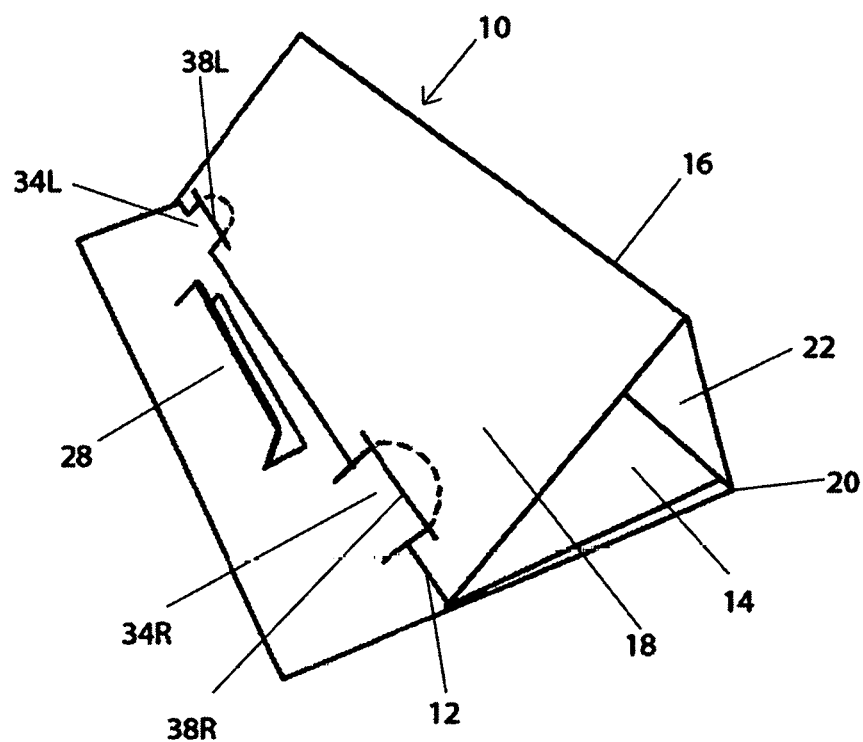
FIG. 3 shows a version of the assembled holder.

FIG. 3 shows the assembled view.

Sheet 10 folds forward along top score line 12.

Sheet 10 folds forward again along middle score line 16.

The top of sheet 10 touches score line 20, creating a triangular shape consisting of top panel 14, backing panel 18 and panel 22, which sit atop base panel 24.

Tabs 34L and 34R slide into tab insert cuts 38L and 38R.

Support flap 28 folds up to support the mobile device.

The invention claimed is:

1. A support holder for a mobile device comprising:
   a continuous sheet of flexible material;
   a top score line formed parallel to a top transverse boundary of the continuous sheet to define a top panel between the top transverse boundary and the top score line;
   a middle score line formed parallel to the top score line to define a backing panel between the middle score line and the top score line, wherein the top score line is between the top transverse boundary and the middle score line;
   a bottom score line formed parallel to the top score line and the middle score line to define a panel between the middle score line and the bottom score line and a base panel between the bottom score line and a bottom transverse boundary of the continuous sheet, wherein the middle score line is between the top score line and the bottom score line;
   a first tab formed by a first tab perforation in the base panel and a second tab formed by a second tab perforation in the base panel, with the first tab and the second tab positioned between the bottom score line and the bottom transverse boundary of the continuous sheet; and a first tab insert cut and a second tab insert cut formed in the backing panel proximate to the top score line, wherein to form the support holder, the continuous sheet will be folded about the top score line, the middle score line, and the bottom score line such that the first tab being inserted into the first tab insert cut and the second tab being inserted into the second tab insert cut to form a triangular shape of the support holder.

2. The support holder of claim 1, wherein the first tab and the second tab have a tab height and the first tab insert cut and the second tab insert cut are formed in the backing panel at a distance the top score line that is less than one half the tab height of the first tab and the second tab.

3. The support holder of claim 1, wherein a top panel height from the top transverse boundary to the top score line is equal to a backing panel height from the top score line to the middle score line.

4. The support holder of claim 1, further comprising a support flap cut formed in the base panel and defining a support flap in the base panel that will be positioned between the bottom transverse boundary and the backing panel when the first tab and the second tab are inserted into the first insert cut and the second insert cut, respectively, and the support flap folds out of a plane of the base panel such that an edge of the mobile device can be inserted between the backing panel and the support flap when the support holder is formed.

5. The support holder of claim 4, wherein an attached end of the first tab and an attached end of the second tab are aligned along a tab line, wherein the support flap cut includes a top flap cut, a first lateral flap cut, and a second lateral flap cut, and the top flap cut is aligned along the tab line.

6. The support holder of claim 4, wherein the support flap is transversely centered in the base panel between a first lateral boundary and a second lateral boundary of the continuous sheet, wherein the support flap cut includes a top flap cut, a first lateral flap cut, and a second lateral flap cut, and the first lateral flap cut and the second lateral flap cut extend away from each other and towards the bottom transverse boundary as the first lateral flap cut and the second lateral flap cut extend from the top flap cut.

7. The support holder of claim 6, comprising a fourth score line in the base panel for folding the support flap out of the plane of the base panel.

8. A support holder for a mobile device comprising:
a continuous sheet of flexible material;
a top panel defined between a top transverse boundary of the continuous sheet and a top score line formed parallel to the top transverse boundary;
a backing panel defined between the top score line and a middle score line formed parallel to the top score line, wherein the top score line is between the top transverse boundary and the middle score line;

a panel defined between the middle score line and a bottom score line formed parallel to the top score line and the middle score line and a base panel between the bottom score line and a bottom transverse boundary of the continuous sheet, wherein the middle score line is between the top score line and the bottom score line;

a first tab formed by a first tab perforation in the base panel and a second tab formed by a second tab perforation in the base panel, with the first tab and the second tab positioned between the bottom score line and the bottom transverse boundary of the continuous sheet; and a first insert cut and a second insert cut formed in the backing panel proximate to the top score line, wherein to form the support holder, the continuous sheet will be folded about the top score line, the middle score line, and the bottom score line such that the first tab being inserted into the first insert cut and the second tab being inserted into the second tab insert cut to form a triangular shape of the support holder.

9. The support holder of claim 8, wherein the first tab and the second tab have a tab height and the first insert cut and the second insert cut are formed in the backing panel a distance from the top score line that is less than one half the tab height of the first tab and the second tab.

10. The support holder of claim 8, wherein a top panel height from the first transverse boundary to the top score line is equal to a backing panel height from the top score line to the middle score line.

11. The support holder of claim 8, further comprising a support flap cut formed in the base panel and defining a support flap in the base panel that will be positioned between the bottom transverse boundary and the backing panel when the first tab and the second tab are inserted into the first insert cut and the second insert cut, respectively, and the support flap folds out of a plane of the base panel such that an edge of the mobile device can be inserted between the backing panel and the support flap when the support holder is formed.

12. The support holder of claim 11, wherein an attached end of the first tab and an attached end the second tab are aligned along a tab line, wherein the support flap includes a top flap cut, a first lateral flap cut, and a second lateral flap cut, and the top flap cut is aligned along the tab line.

13. The support holder of claim 11, wherein the support flap is transversely centered in the base panel between a first lateral boundary and a second lateral boundary of the continuous sheet, wherein the support flap cut includes a top flap cut, a first lateral flap cut, and a second lateral flap cut, and the first lateral flap cut and the second lateral flap cut extend away from each other and towards the bottom transverse boundary as the first lateral flap cut and the second lateral flap cut extend from the top flap cut.

14. The support holder of claim 13, comprising a fourth score line in the base panel for folding the support flap out of the plane of the base panel.

* * * * *